United States Patent [19]
Bloom, Sr.

[11] 3,717,975
[45] Feb. 27, 1973

[54] APPARATUS FOR CORRECTING PRINTING ERRORS

[76] Inventor: Donald W. Bloom, Sr., R.D. No. 8, Box 337, Greensburg, Pa. 15601

[22] Filed: July 2, 1971

[21] Appl. No.: 159,183

[52] U.S. Cl. .................355/78, 355/95, 355/46, 355/132
[51] Int. Cl. .............................G03b 27/04
[58] Field of Search ........95/4.5; 355/46, 132, 78, 95

[56] References Cited

UNITED STATES PATENTS

| | | | |
|---|---|---|---|
| 1,591,118 | 7/1926 | Friess | 355/132 |
| 2,740,324 | 4/1956 | Cahill | 355/46 X |
| 3,041,930 | 7/1962 | Davidson | 95/4.5 X |
| 2,883,918 | 4/1959 | Mosteller | 95/4.5 |
| 2,887,024 | 5/1959 | Horman | 95/4.5 |

Primary Examiner—John M. Horan
Attorney—H. W. Williamson

[57] ABSTRACT

This invention relates to a photo correction apparatus that employs a light chamber and a pair of slidable masks with a light in the base of the chamber to facilitate the registration of a print having need of corrections with a film having the needed corrections thereon. The slidable masks are so positioned as to allow the exposure of selected correct lines on the original, while obliterating the incorrect lines. The apparatus may then have a film print with corrections thereon positioned in registration over the then partially exposed film to allow the slidable masks to be moved to position corrected portions of the film, which are then in turn exposed to a light source so that the finished fully exposed film is corrected. The apparatus also includes a safety light that is housed in the light chamber, which light source has a color that will not expose the film to be exposed to the exposure light source. This aids the user in determining whether registration has been maintained.

6 Claims, 2 Drawing Figures

PATENTED FEB 27 1973

3,717,975

INVENTOR
DONALD W. BLOOM SR.
BY
ATTORNEY

APPARATUS FOR CORRECTING PRINTING ERRORS

This invention relates to a photo correction apparatus.

More specifically this invention relates to a photoprint correction apparatus which includes a light chamber having a bottom which has a light source and means to control the light source externally thereof. A cover for the chamber is provided which has positioned thereon a pair of guides mounted parallel to each other and in addition positioned thereon are slidable mask elements.

The chamber cover has a translucent material integral with an opening in the chamber cover. The slidable mask elements are situated between the guides so that the slidable mask elements may be moved relative to each other to thereby mask specified portions of the translucent material. The covering has mounted thereon an adjustable exposure light source provided to illuminate portions of the translucent material not covered by the slidable mask elements.

In this modern era more and more typesetting involves the use of computers and photographic techniques to render a finished printed product. Unfortunately such systems are not infallible and therefore we have produced developed positive or negative films which have errors in different lines of the film. In order to correct these errors a number of techniques have been employed, such as taking a sharp instrument and cutting out the bad lines and then carefully replacing the removed line with a film strip which contains the corrections. The insertion of the new line is time-consuming and requires great care to avoid any overlap over the adjacent correct lines. Another approach to corrections is to chemically remove the incorrect line and then replace it with a correct line. This approach has its pitfalls for when the incorrect line is removed, great care must be exercised lest an adjacent line which is correct be obliterated or affected by the chemical.

To all these problems the invention to be described provides a novel answer by utilizing an extraordinarily simple method and apparatus to accomplish such corrections.

It is therefore an object of this invention to provide an apparatus for correcting developed film in need of correction by masking off incorrect portions of the film and exposing the correct portions to an unexposed film.

Another object of this invention is to provide an apparatus which allows correction by superimposing over a partially exposed film a corrected developed film which is then submitted to a light source to expose the correct portions of the developed film to the partially exposed film to render a completely exposed film with all the needed corrections.

In the attainment of the foregoing objects the preferred embodiment of the invention includes the following basic apparatus. A photo print correction apparatus which includes a light chamber having an internal surface which has a light source secured thereto, which light source is controlled externally of the chamber. In the preferred embodiment of the invention there are a pair of different colored lights one of which has a color that will not expose a film to be referred to hereinafter. A chamber cover is provided which has a pair of guides mounted thereon parallel to each other. Positioned on and between the guides are a pair of slidable masks. The slidable masks are free to slide in a direction parallel to the pair of guides while simultaneously having the capacity to pivotally move through an angle while the slidable mask is moving parallel to the guides. The chamber cover has a translucent material integral with an opening in the chamber cover. This arrangement allows the masks to move relative to a printed line on a layer of film which has been placed on the translucent material. The light chamber cover has mounted thereon an adjustable exposure light source which is both pivotally and slidably adjustable to a layer of film which has been placed on the translucent material.

Other objects and advantages of the invention will become apparent from the ensuing description of an illustrative embodiment thereof, in the course of which reference is had to the accompanying drawings in which.

In order to understand the function of apparatus to be described the total method steps of operation of making corrections to a film sheet having need of correction is briefly set forth.

An originally developed film is placed in register with a developed film containing the needed corrections in such a manner that they will always be subsequently registered one with the other even through separated. The originally developed film in need of correction is placed over an unexposed film. This step is followed by exposing only those portions of the originally developed incorrect film which are correct, thereby allowing only correct portions of the originally developed incorrect film to be exposed to the unexposed film which in turn results in a partially exposed film with only correct material thereon. The originally developed incorrect film is then removed. The developed film with corrections is placed over the partially exposed film and this followed by the step of exposing the corrected film, where corrections are needed in the original incorrect film, to the partially exposed film to thereby produce a completely corrected image on the formerly partially exposed film. After this step the developed film with corrections is removed and the completely exposed film, which includes original plus corrected material, is then developed. A more detailed description of the method may be had by a study of my copending application for Letters Pat. of the U.S., Ser. No. 140,219, filed May 4, 1971, for Method of Correcting Printing Errors.

Figure 1:
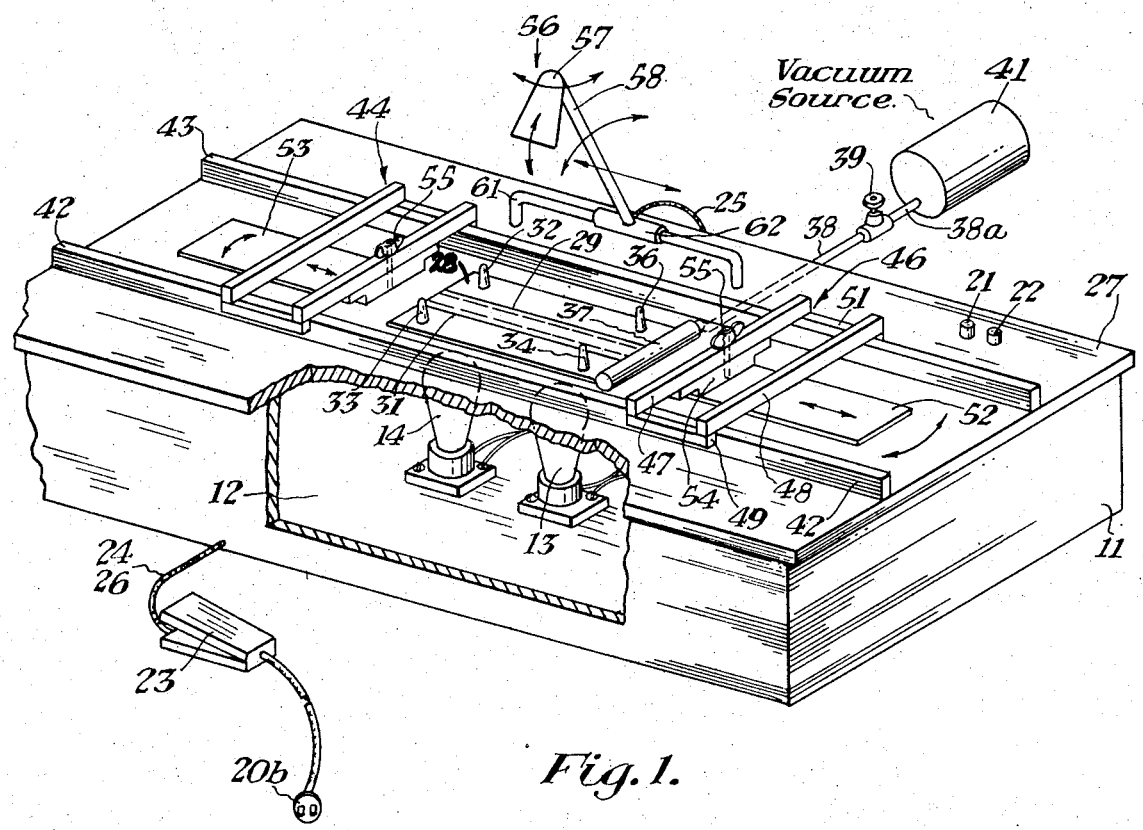
FIG. 1 illustrates a three-dimensional embodiment of the invention.

Reference is now made to FIG. 1 which shows a three-dimensional view of the apparatus that is employed to accomplish the method just noted above. Basically the apparatus consists of a light chamber 11 which has on the bottom internal 12 thereof (shown in broken-away section) a pair of light sources 13 and 14. The light sources 13, 14 are turned on via pushbutton switches 21, 22, respectively, which connect plugs, not shown, to leads to the light 13 as well as leads to the light 14. This light source 13 is used for purposes of registering film prints. It will be noted that this light source 13 is conventionally a white light source and whenever the light source 13 is desired to be actuated, the pushbutton operated switch 21 is turned on. The details of foot operated switch 23 is not significant to the invention and may be comprised of any type of switch actuated manually by the operator of this apparatus.

The light chamber 11 also has a chamber cover 27, which chamber cover 27 has a portion integral with it of translucent material 28. This translucent material 28 may be frosted glass or plexiglass and forms a window in the chamber cover 27. It can be seen that the translucent material 28 has a plurality of registering pins 32, 33, 34 and 36. These pins operate in cooperation with prepunched film which is placed over the registering pins 32, 33, 34, and 36 to provide the desired registration noted in the above-described method. There is in addition to the translucent material 28 a vacuum header 37 which has in communication therewith holes bored through the translucent material the length thereof, which in turn have grooved vacuum slots 29 and 31 in communication with the surface of the translucent material 28. Connected to the vacuum header 37 is a vacuum conduit 38 which in turn has integral with it a vacuum control valve 39 which in turn is coupled to a vacuum source 41 by conduit 38a. This vacuum source 41 working in conjunction with the groove vacuum slots 29, 31 in translucent material 28 provides the capacity of providing a source of vacuum to the surface of the translucent material 28 whenever the valve 39 is opened. This vacuum source secures any film placed upon the translucent material 28 during some of the steps of the process above described.

Figure 2:
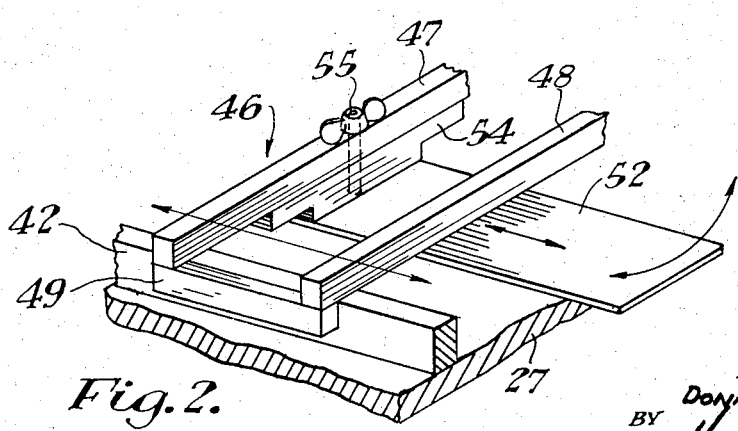
FIG. 2 depicts the physical cooperation between a slidable mask and other portions of the apparatus.

On the surface of the chamber cover 27 are a pair of guides 42, 43 which run the length of the chamber cover 27. Positioned on these guides 42, 43 are a pair of slidable mask carriers 44 and 46. The details of this slidable mask carrier 46 are shown in FIG. 2 where it can be seen that the slidable mask carrier 46 includes a pair of guide cross members 47, 48 which have integrally secured thereto a cross guide support member 49, and if reference is now made to FIG. 1, it will be seen at the opposite end of the slidable mask carrier 46 that there is a second cross guide support member 51. These slidable mask carriers are manually movable along the guides 42 and 43 and cooperate with a slidable mask 52 best shown in FIG. 2. The slidable mask 52 has an upstanding pivotal member 54 between the cross guide support members 47, 48 to effectuate a limited pivotal motion of the slidable mask member relative to the slidable mask carrier 46. This is important when the film has been placed upon the translucent surface 28, and the slidable mask carrier 46 has been moved to a position over a film placed on the translucent surface 28, and the alignment of the print on the film is such that some small movement is needed in the slidable mask member to correct for line position inaccuracies of the printed material. It will be noted that the slidable mask carrier 44 also has a slidable mask 53 with an upstanding portion 55 and it also allows for movement of the slidable mask 53 relative to the slidable mask carrier 44. Both the slidable mask carriers 44 and 46 may be moved laterally above the surface of the translucent material 28 to position the slidable masks relative to each other to thereby allow registration of an incorrect original film with a copy of material which includes corrections placed over the original film which has been placed on the translucent material 28. It will be noted that when the copy in need of correction is placed in register with the film that has corrections thereon, the white light source 13 will be actuated and provide illumination so that the operator of this device may secure a correct registration between the film copy in need of correction and film copy containing corrections thereon. This figure also shows a second colored light source 14 which in this case is considered a safety light and may be of any preselected color that is compatible with the film to be used in the final exposure prior to removal of this film for development. The safety light 14 allows, when actuated by pushbutton switch 22 connected by leads to the light 14, as well as to a plug not shown, the illumination of unexposed film not shown to check for registration. This safety light source will in no way affect the exposure of the film. There is in addition to the two light sources 13, 14 an adjustable exposure light 56. This adjustable exposure light 56 is operated by foot operated switch 23 which has a plug 20b to deliver power over leads 24, 26 to lead 25 which in turn supplies the power to the adjustable exposure light source 56. It will be noted that the head of the light source is pivotally connected at point 57 and is supported by extensible arm 58, here shown as a telescoping arrangement, but any arrangement by which the exposure light source 56 may be moved relative to the surface of translucent material 28 is contemplated to be within the scope of this invention. The extensible arm 58 is in turn free to move in the direction of the arrows as is the exposure light source 56 which is also movable in the direction shown by the arrows that pass over it. The extensible arm 58 is secured to an exposure light support bracket 61 which is fixed to the cover 27 of the light chamber 11 and in turn this extensible arm 58 is secured in a sliding gripping relationship via the sleeve 62 to the exposure light support bracket 61. This permits the entire adjustable light assembly to move in a direction parallel to movable slidable mask 52, 53. It can therefore be seen that there is provided a unique light chamber photo correction apparatus which allows a maximum degree of freedom in its usage, while retaining prints of exposable film in register on the translucent surface 28 during the entire method operation discussed at the outset of the specification.

It will also be apparent that other modifications and changes can be made to the presently described invention and it is therefore understood that all changes, equivalents and modifications falling within the spirit and scope of the present invention are herein meant to be included in the appended claims. Such changes contemplate that the entire system may be modified by mechanical equivalents with reference to the related components and the same holds true with reference to hydraulic, pneumatic, or electrical systems or combinations which accomplish the same end.

Having thus described my invention, what I claim is:

1. A photoprint correction apparatus, said apparatus including,
   a. a light chamber having an internal surface which has a light source secured thereto, and means to control said light source externally thereof, b. a chamber covering means having positioned thereon a pair of guides mounted and having positioned thereon slidable mask means,
c. said chamber covering means having a translucent material integral with an opening in said chamber covering means, said slidable mask means positioned between said guides so that said slidable mask means may be moved relative to each other to thereby mask specified portions of said translucent material,
  said slidable mask means is free to slide in a direction parallel to said pair of guides while simultaneously having the capacity to pivotally move through an angle while said slidable mask is moving parallel to said guides to thereby allow said masks to move relative to a printed line on a layer of film which has been placed on said translucent material,
d. said covering means having mounted thereon an adjustable exposure light source provided to illuminate portions of said translucent material not covered by said slidable mask means.

2. The photoprint correction apparatus of claim 1, wherein said guides are parallel to each other.

3. The photoprint correction apparatus of claim 1, wherein the light chamber light source has a pair of lights of different colors.

4. The photoprint correction apparatus of claim 1, wherein said translucent material is a frosted plexiglass.

5. The photoprint correction device of claim 1, wherein said adjustable exposure light is both pivotally and slidably adjustable to said layer of film which has been placed on said translucent material.

6. The photoprint correction device of claim 1, wherein said translucent material has internally thereof openings the length of said translucent material, said translucent material having grooves in connection therewith and a vacuum source connected to said openings and controllable to apply a vacuum to said grooves via said openings to thereby ensure that materials on said translucent material are securely held in place.

* * * * *